(12) United States Patent
Byrne

(10) Patent No.: US 10,744,745 B2
(45) Date of Patent: Aug. 18, 2020

(54) WINDOW ASSEMBLY FOR VEHICLE WITH VARIABLE THICKNESS PROFILE ASSOCIATED WITH FRONT-FACING CAMERA

(71) Applicants: AGC Automotive Americas R&D, Inc., Ypsilanti, MI (US); AGC Flat Glass North America, Inc., Alpharetta, GA (US)

(72) Inventor: Colin Byrne, Ypsilanti, MI (US)

(73) Assignees: AGC Automotive Americas R&D, Inc., Ypsilanti, MI (US); AGC Flat Glass North America, Inc., Alpharetta, GA (US)

( * ) Notice: Subject to any disclaimer, the term of this patent is extended or adjusted under 35 U.S.C. 154(b) by 149 days.

(21) Appl. No.: 16/301,642

(22) PCT Filed: May 18, 2017

(86) PCT No.: PCT/US2017/033327
§ 371 (c)(1),
(2) Date: Nov. 14, 2018

(87) PCT Pub. No.: WO2017/201286
PCT Pub. Date: Nov. 23, 2017

(65) Prior Publication Data
US 2019/0217579 A1    Jul. 18, 2019

Related U.S. Application Data

(60) Provisional application No. 62/338,760, filed on May 19, 2016.

(51) Int. Cl.
*B32B 17/10* (2006.01)
*G02B 27/01* (2006.01)
*G06K 9/00* (2006.01)

(52) U.S. Cl.
CPC .. *B32B 17/10568* (2013.01); *B32B 17/10036* (2013.01); *G02B 27/0101* (2013.01);
(Continued)

(58) Field of Classification Search
CPC ........ B32B 17/10568; B32B 17/10036; G02B 27/0101; G02B 2027/011; G02B 2027/0138; G06K 9/00791; G06K 9/209
(Continued)

(56) References Cited

U.S. PATENT DOCUMENTS 5,639,538 A    6/1997 Wong
5,812,332 A    9/1998 Freeman
(Continued)

FOREIGN PATENT DOCUMENTS

JP    2009035444 A    2/2009
JP    2010190121 A    9/2010
(Continued)

OTHER PUBLICATIONS

English language abstract and machine-assisted English translation for JP 2010-190121 extracted from espacenet.com database on Dec. 12, 2018, 16 pages.
(Continued)

*Primary Examiner* — James R Greece
(74) *Attorney, Agent, or Firm* — Howard & Howard Attorneys PLLC

(57) ABSTRACT

A system for a vehicle includes a window assembly adapted to be installed within the front opening of the vehicle frame. The window assembly includes an inner transparent sheet, an outer transparent sheet, and an interlayer of polymer disposed between the inner transparent sheet and the outer transparent sheet. The interlayer is configured wherein a first portion of the interlayer has a first variable thickness profile and wherein a second portion of the interlayer has a second
(Continued)

variable thickness profile, with the first portion of the interlayer distinct from the second portion of the interlayer. The system also includes a front-facing camera positioned within the vehicle for receiving light transmissions from an object located outside the vehicle through the first portion. The system may also include a head up display—associated with the second portion of the interlayer.

18 Claims, 9 Drawing Sheets

(52) U.S. Cl.
CPC ............ *G02B 2027/011* (2013.01); *G02B 2027/0138* (2013.01); *G06K 9/00791* (2013.01)

(58) Field of Classification Search
USPC ........................................ 359/630
See application file for complete search history.

(56) References Cited

U.S. PATENT DOCUMENTS

| | | | |
|---|---|---|---|
| 6,789,901 B1 | 9/2004 | Kormos | |
| 6,791,511 B2 | 9/2004 | Eschler et al. | |
| 8,451,541 B2 | 5/2013 | Labrot et al. | |
| 8,610,992 B2* | 12/2013 | Varaprasad | B60R 1/089 359/275 |
| 8,764,923 B2 | 7/2014 | Durbin et al. | |
| 8,859,080 B2 | 10/2014 | Thellier et al. | |
| 9,915,822 B2 | 3/2018 | Arndt et al. | |
| 2003/0169213 A1 | 9/2003 | Spero | |
| 2004/0135742 A1 | 7/2004 | Weber et al. | |
| 2007/0279755 A1 | 12/2007 | Hitschmann et al. | |
| 2010/0314900 A1 | 12/2010 | Labrot et al. | |
| 2013/0317243 A1 | 11/2013 | Okawa et al. | |
| 2016/0291324 A1 | 10/2016 | Arndt et al. | |
| 2017/0003503 A1 | 1/2017 | Arndt et al. | |
| 2017/0050415 A1* | 2/2017 | Kanki | B32B 17/10036 |

FOREIGN PATENT DOCUMENTS

| | | |
|---|---|---|
| JP | 2011088801 A | 5/2011 |
| JP | 5522280 B2 | 6/2014 |
| JP | 2015160779 A | 9/2015 |
| WO | 2015086233 A1 | 6/2015 |
| WO | 2015086234 A1 | 6/2015 |

OTHER PUBLICATIONS

English language abstract and machine-assisted English translation for JP 2011-088801 extracted from espacenet.com database on Dec. 12, 2018, 11 pages.

English language abstract and machine-assisted English translation for JP 5522280 extracted from espacenet.com database on Dec. 12, 2018, 28 pages.

English language abstract and machine-assisted English translation for JP 2015-160779 extracted from espacenet.com database on Dec. 12, 2018, 28 pages.

English language abstract for WO 2015/086233 extracted from espacenet.com database on Dec. 12, 2018, 2 pages.

English language abstract for WO 2015/086234 extracted from espacenet.com database on Dec. 12, 2018, 2 pages.

International Search Report for Application No. PCT/US2017/033327 dated Aug. 18, 2017, 4 pages.

English language abstract and machine-assisted English translation for JP 2009-035444 extracted from espacenet.com database on Dec. 19, 2018, 28 pages.

* cited by examiner

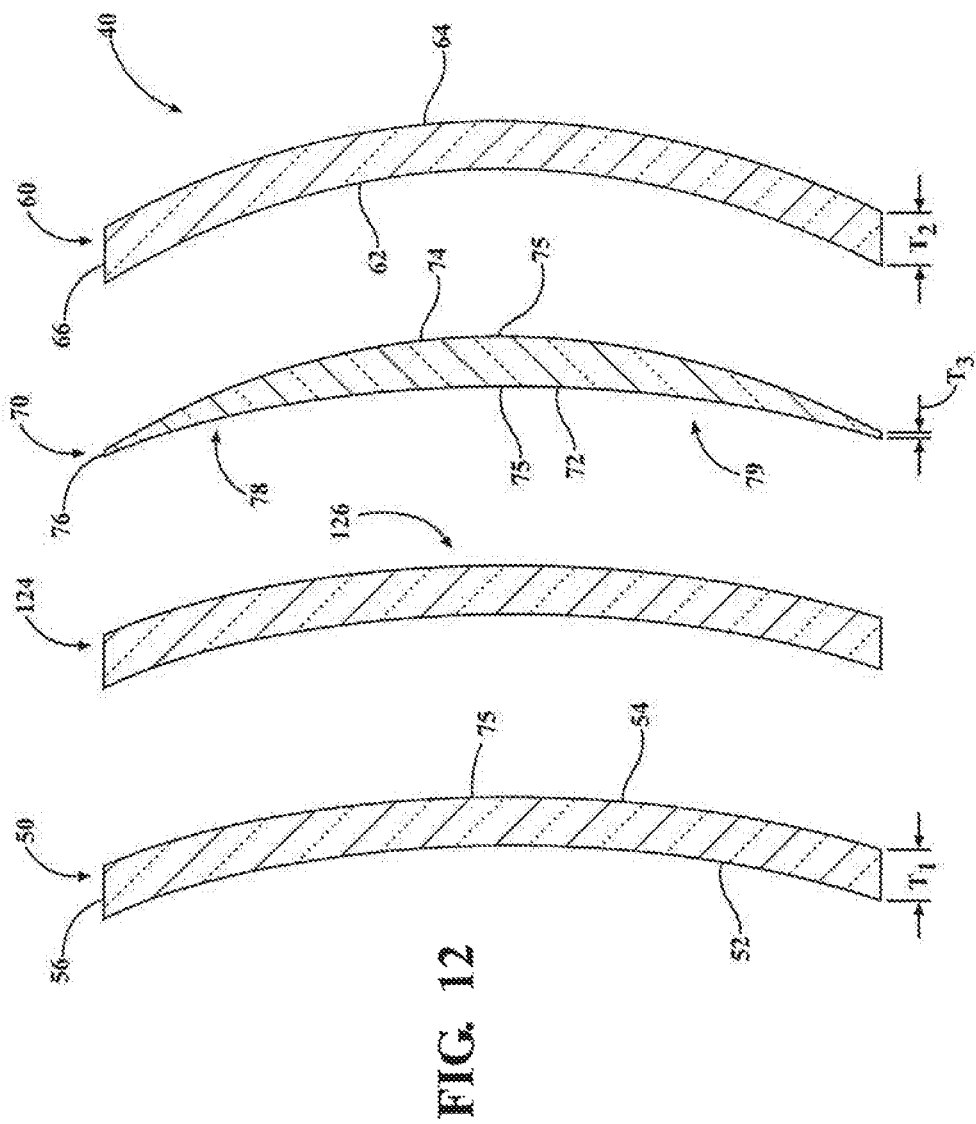

WINDOW ASSEMBLY FOR VEHICLE WITH VARIABLE THICKNESS PROFILE ASSOCIATED WITH FRONT-FACING CAMERA

CROSS-REFERENCE TO RELATED APPLICATIONS

The present application is the National Stage of International Patent Application No. PCT/US2017/033327, filed on May 18, 2017, which claims priority to and all the benefits of U.S. Provisional Patent Application No. 62/338,70, filed on May 19, 2016, the content of which are hereby expressly incorporated herein by reference in their entirety.

This application claims priority to U.S. Provisional Application No. 62/338,760, filed May 19, 2016, the content of which is incorporated herein by reference.

BACKGROUND OF THE INVENTION

1. Field of the Invention

The subject invention generally relates to a window assembly for a vehicle. More specifically, the subject invention relates to a window assembly for a vehicle that has a front-facing camera and a variable thickness profile associated with the front-facing camera.

2. Description of the Related Art

Recently, land vehicles have incorporated back-up and front-facing cameras for the purpose of improving the vehicle's safety systems. A back-up camera makes it possible for you to see objects behind a driver that may not be visible through the vehicle's mirrors. A front-facing camera is primarily used to provide information to the vehicle's driver assistance systems. The light transmissions captured by the front-facing or back-up camera can be processed as data that can be used by the operator of the vehicle for various purposes. Typically, the back-up camera is positioned outside of the passenger compartment of the land vehicle, while the front-facing camera is positioned within the passenger compartment of the land vehicle.

Recently, front-facing cameras have been positioned in the passenger compartment of vehicle in a position that allows the camera to view objects in front of the vehicle without impeding the vision of the operator of a vehicle. However, front-facing cameras positioned within the vehicle must necessarily receive light transmissions from outside the vehicle through the window assembly of the vehicle. This window assembly may consist of a single pane of glass, but is more typically a laminated window assembly including an interlayer of polymer disposed between inner and outer sheets of transparent material. Accordingly, light transmissions from an object must travel through the one or more layers of the window assembly to be received by the front-facing camera. Ideally, the light rays passing through the window travel along a single path through the vehicle and are captured by the front-facing camera as a group of light rays corresponding to a primary image of the object.

It has been observed that a secondary image, or double image, is reflected off the inner and outer surfaces of the window assembly. This secondary image is superimposed over but offset from the primary image and reduces the overall image clarity of the images or objects received from the light transmissions travelling to the front-facing camera from the object through the window assembly. The transmitted double image, or ghost image, occurs when two light transmissions from an object take different paths from outside the vehicle and through the window assembly to the front-facing camera.

In many vehicle systems, in addition to having a front-facing camera, the vehicle also includes a head-up display. The head-up display (also known as a HUD) is a transparent display that presents data to the driver without obstructing the view of objects beyond the display. The head-up display in land vehicles is generally positioned so that the viewer keeps their gaze in front of the vehicle as opposed to looking downward at information on the vehicle dashboard.

Head-up displays have also been used in vehicles with laminated window assemblies, with the laminated window assemblies being used as the combiner in a head-up display system to reflect a primary display image to a viewer positioned within the vehicle. Similar to the issues presented with respect to front-facing cameras receiving light transmission through a window assembly, it has also been observed that a secondary image, or double image, is reflected off the outer surface of the window assembly. This secondary image is superimposed over but offset from the primary image and reduces the overall image clarity to the viewer positioned within the vehicle.

To reduce effects of double imaging due to HUD with laminated window assemblies, the interlayer of laminated window assembly has been modified to include a wedge-shaped thickness profile, in which the interlayer is formed having a varying and increasing thickness profile from a bottom portion to a top portion of the window assembly. The function of the wedge-profile is to change the optics of the window assembly such that reflected light within the window assembly overlaps with the light rays reflected directly off the inner surface of the window assembly.

However, in land vehicles including both a front-facing camera and a HUD, while the inclusion of a wedge-shaped thickness profile having increasing thickness from the bottom of portion to the top portion of the window assembly may be beneficial to addressing the issue of double images with respect to HUD, this same wedge-shaped thickness profile actually, exacerbates the issue of double images with respect to the front-facing camera that receives light through a different portion of the window.

It would thus be advantageous for land vehicles to have window assemblies in which the window assembly is designed in which the interlayer includes multiple distinct portions having a specifically designed wedge shaped thickness profile that reduces or minimizes the effects of double imaging for light transmissions for more than one respective device or person seated within the passenger compartment of a vehicle that receives light transmissions through the respective portion of the interlayer of the window assembly, and thus may, experience the effects of double images. Thus, for example, it would thus be advantageous for land vehicles having both a front-facing camera and a HUD to have a window assembly for a vehicle which reduces or minimizes the effects of double imaging for light transmissions received by a front-facing camera through a first portion of the window assembly while also reducing or minimizing the effects of double imaging for images viewed from a second portion of the window assembly associated with the head up display.

SUMMARY OF THE INVENTION AND ADVANTAGES

The invention provides a system for a vehicle having a vehicle frame, the vehicle frame having a pair of side portions extending between a top portion and a bottom portion that collectively define a front opening there within. The system includes a window assembly having an upper edge, a lower edge, a first side edge and a second side edge each extending between the upper edge and the lower edge, the first side edge opposite the second side edge. The window assembly is adapted to be installed within the front opening of the vehicle frame such that the upper edge is positioned adjacent to the top portion and the lower edge is positioned adjacent to the bottom portion and such that the first and second side edge are positioned adjacent to a respective one of the pair of side portions. The window assembly includes an inner transparent sheet, an outer transparent sheet, and an interlayer of polymer disposed between the inner transparent sheet and the outer transparent sheet, wherein a first portion of the interlayer has a first variable thickness profile and wherein a second portion of the interlayer has a second variable thickness profile, with the first portion of the interlayer being distinct from the second portion of the interlayer. The system also includes a front-facing camera positioned within the vehicle for receiving light transmissions from an object located outside of the vehicle through the first portion of the interlayer.

The inclusion of a first variable thickness profile within the first portion of the interlayer reduces or minimizes the effects of double imaging for light transmissions received from objects located outside of the vehicle by the front-facing camera that travel through the first portion of the window assembly. Accordingly, the size, shape, color and location of objects located in front of the vehicle, as well as any other desired feature, may be more precisely, determined.

In further embodiments, the system includes a head up display unit associated with the second portion of the interlayer. In still further embodiments, the head up display may be electrically coupled with the front-facing camera. In these embodiments, the second portion of the interlayer has a second variable thickness profile different from the first variable thickness profile that is reduces or minimizes the effects of double imaging for images viewed from the second portion of the window assembly associated with the head up display.

In yet still further embodiments, the front-facing camera may be electrically coupled to an autonomous driving system in the vehicle.

In even still further embodiments, as opposed to associating the second portion of the interlayer with a head up display, the second portion of the window assembly may be associated with another device contained within the vehicle or a person positioned within the passenger compartment of the vehicle that receives light transmissions through the second portion of the interlayer of the window assembly. Thus, for example, in another embodiment, the second portion of the interlayer is associated with the driver eye point of a driver of a vehicle, and thus functions to reduce or minimize the effect of double imaging for images viewed by the driver from outside of the vehicle through the second portion of the window assembly.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 12 is an exploded side perspective view of a window assembly including an additional transparent layer in accordance with another embodiment of the present invention.

DETAILED DESCRIPTION OF THE INVENTION

Referring to the Figures, wherein like numerals indicate corresponding parts throughout the several views, a system for a vehicle 20 is generally shown as 21. As shown in the Figures, the system 21 includes a window assembly 40. The window assembly 40 may be a front window (windshield) as also illustrated in the Figures.

Figure 1:
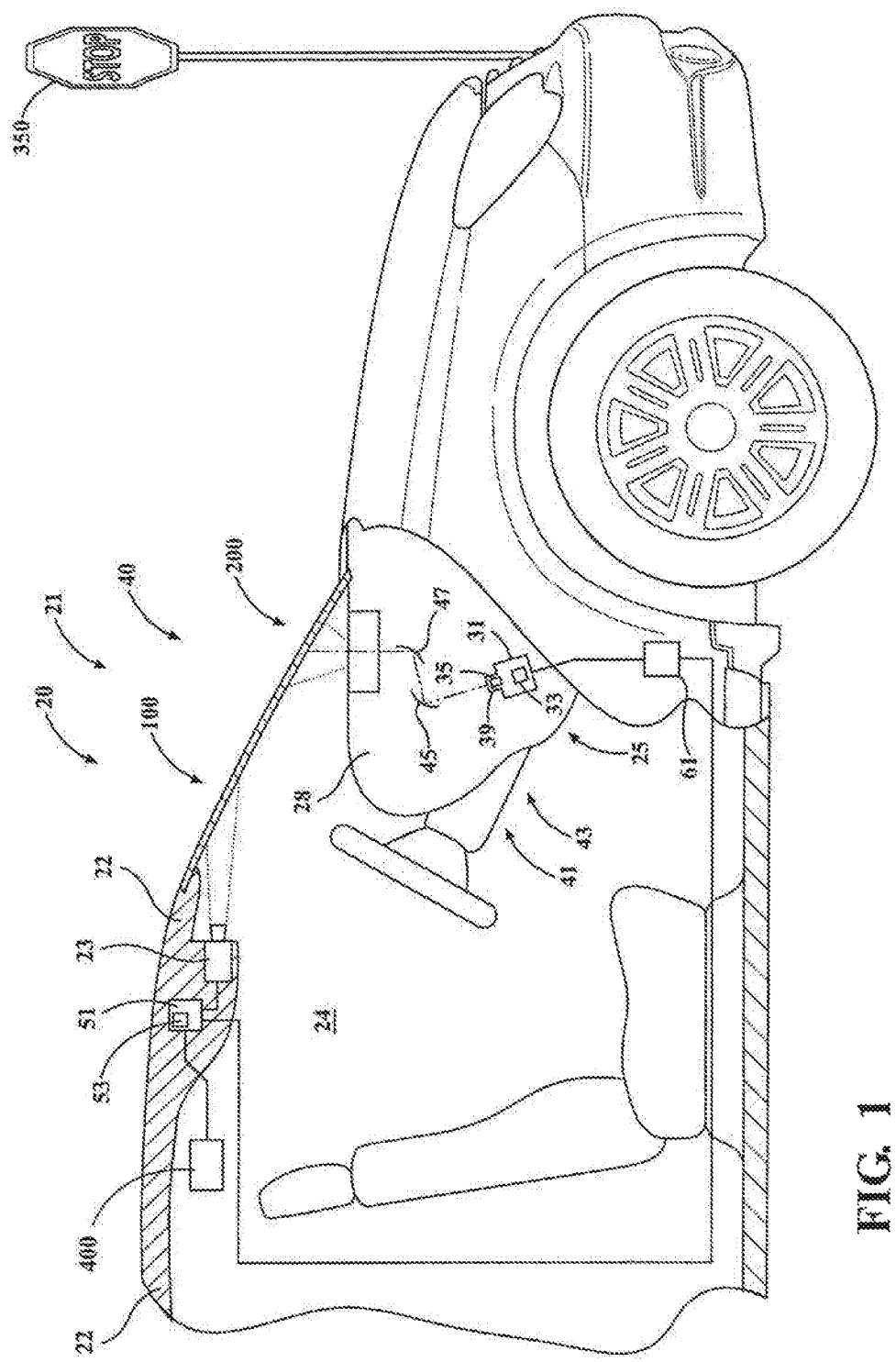
FIG. 1 is a side perspective view of a vehicle having a window assembly according to an embodiment of the present invention
Figure 2:
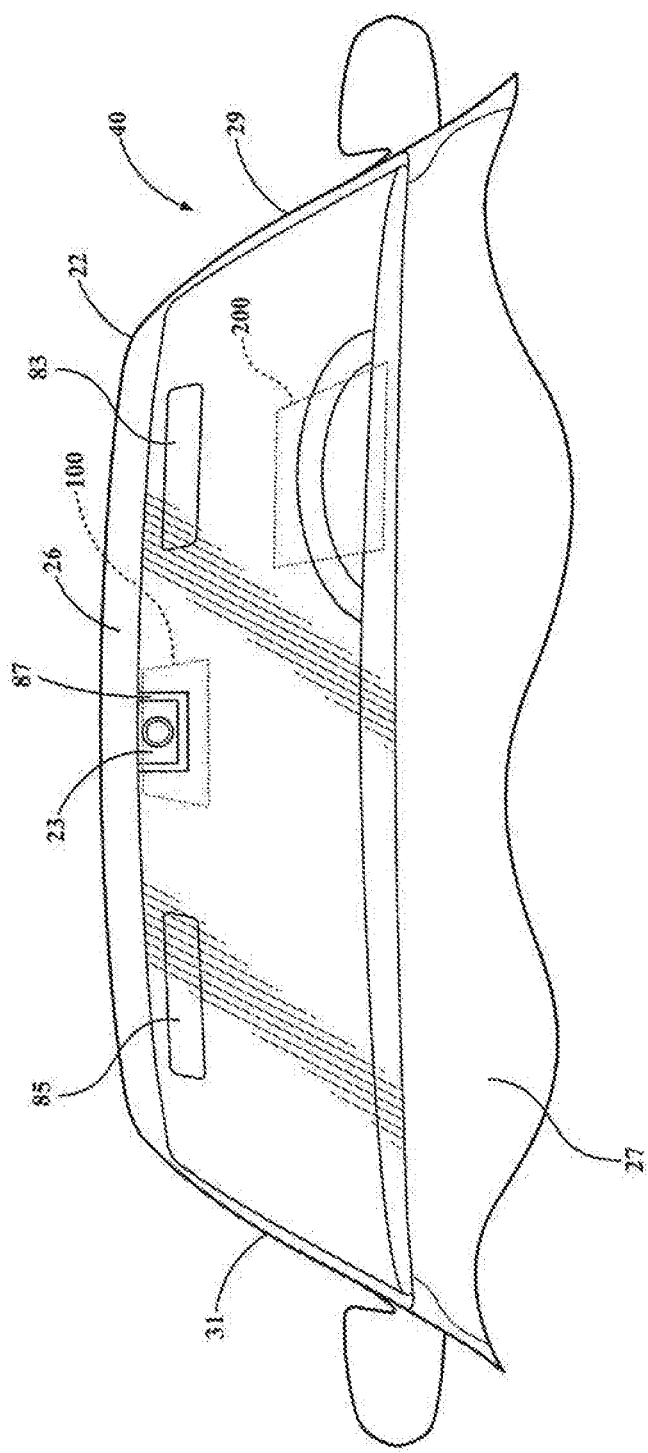
FIG. 2 is front view of a portion of the vehicle of FIG. 1.

As best shown in FIGS. 1 and 2, the vehicle 20 includes a vehicle frame 22 defining a front opening into which the window assembly 40 is installed such that the window assembly 40 is visible from the passenger compartment 24 of the vehicle 20. The vehicle 20 also includes a camera 23 positioned within the passenger compartment 24 of the vehicle for receiving light transmissions from an object 350 located outside the vehicle through a first portion 100 of the window assembly 40. The object 350 may be any object that is located in front of the vehicle 20, including but not limited to other vehicles, road signs, lane markers and the like. These objects 350 may vary in shape, size, color and location. For illustrative purposes, the object 350 as illustrated in FIG. 1 is a stop sign. When the window assembly 40 is the front window as illustrated FIGS. 1 and 2, the camera 23 is also referred to as a front-facing camera 23. The vehicle 20 may also include a head up display unit 25 (hereinafter referred to as a head up display unit 25 or HUD 25 or HUD unit 25) for displaying a virtual image on a second portion 200 of the window assembly 40. The first portion 100 and second portion 200 define distinct portions of the window assembly 40.

The camera 23 may be any kind of camera that can receive light transmissions from an object 350 through the first portion 100 of the window assembly 40 of the vehicle 20. The camera 23 is capable of receiving light transmission in a desired range of wavelengths and includes equipment to capture the light transmissions and turn these into an electrical signal. Exemplary cameras 23 that can be used include, but are not limited to, visible light cameras and infrared light cameras.

The electrical signals generated within the front-facing camera 23 corresponding to the received light transmissions from the object 350 through the first portion 100 of the window assembly 40 are sent to a computer 51 contained within the vehicle 20 that is electrically connected to the camera 23. A processing unit 53 within the computer 51 continually processes the sent electrical signal into data, typically in the form of a second electrical signal. This data, or second electrical signal, can be displayed in a manner corresponding to the size, shape, color and distance for that object 350 (such as being displayed as a virtual image on a second portion 200 of the window assembly as transmitted from the head up display 25, as will be described further below) or otherwise interpreted by the computer 51 in a manner that is beneficial to the operator of a vehicle.

The head up display unit 25, as shown in FIG. 1, is typically a reflective type unit that includes, as its major components, a picture generating unit 31 having a light source 33 and a combiner/reflector unit 41. The picture generating unit 31 is typically contained below the dashboard 28 of the vehicle 20 and underneath the window assembly 40. In certain embodiments, the picture generating unit 31 includes a high resolution thin-film-transistor (TFT) liquid crystal display 35 that is backlit by a series of light emitting diodes (LEDs) 39 that define the light source 33.

The combiner/reflector unit 41 is located in proximity to the picture generating unit 31 and typically includes a series of deflection mirrors 43 that reflect and/or combine the light emitted from the light source 31 towards the second portion 200 of the window assembly 40. More typically, the series of deflection mirrors 43 includes a non-adjustable mirror 45 and an adjustable mirror 47.

The non-adjustable mirror 45 may be planar or aspherical. The adjustable mirror 47, which is typically aspherical, is used for height adjustment of the head-up display unit 25. This adjustment possibility adapts the position of the virtual image on the second portion 200 of the window assembly 40 relative to the seating position or body size of the driver of the vehicle 20.

In certain embodiments, the head up display unit 25 is coupled to a computer 61 that is electrically coupled to the picture generating unit 31. The computer 61 processes electrical inputs within the vehicle 20 to provide an electrical signal, or data, to the picture generating unit 31 that is interpreted by the picture generating unit 31 to generate a corresponding light pattern and intensity of the light signal emitted from the picture generating unit 31 that corresponds to the desired virtual image displayed on the second portion 200 of the window assembly 40. In certain embodiments, the computer 61 may itself be electrically, coupled to any electronic component on the vehicle 20, including those that display electronically on the dashboard of the vehicle, such as but not limited to the vehicle speed, oil pressure, fuel levels, or the like. Accordingly, the computer 61 processes these electrical inputs to generate the afore-mentioned electrical signal to the picture generating unit 31.

In still further embodiments, the computer 61 is electronically coupled to the front-facing camera 23 and/or to the computer 51. In such embodiments, the light transmissions captured by the front-facing camera 23 through the first portion 100 of the window assembly 40 are sent from the front-facing camera 23 to the computer 51 in the form of an electronic signal. The electronic signal is then processed by the processing unit 53 of the computer 51 and a second electronic signal is then sent from the computer 51 directly to the picture generating unit 31 or through the computer 61. The picture generating unit 31 may then interpret the second electronic signal and generate a corresponding light pattern and intensity of the light signal emitted from the picture generating unit 31 to generate a desired virtual image displayed on the second portion 200 of the window assembly 40, wherein in this case the desired virtual image corresponds to the shape, size, color and location of object 350 that is located in front of the vehicle 20.

As noted above, the vehicle 20 includes a vehicle frame 22 defining a front opening into which the window assembly 40 is installed such that the window assembly 40 is visible from the passenger compartment 24 of the vehicle 20. The front opening is conventionally defined within portions of the vehicle frame 22. More specifically, as best shown in FIG. 2, the front opening of the vehicle frame 22 may be defined by a top portion 26, a bottom portion 27, a first side portion 29 and a second side portion 31 opposite the first side portion 29 of the vehicle frame 22, with the respective first and second side portions 29, 31 each independently extending between the top portion 26 and bottom portion 27. As used herein, the term "top" and "bottom" are typically utilized to orient the vehicle frame 22 with respect to surface of the earth such that top portion 26 is higher in elevation from the surface of the earth than the bottom portion 27.

The window assembly 40 is preferably in the form of a laminated window assembly, and can hereinafter be referred to interchangeably as a window assembly 40 or laminated window assembly 40. The laminated window assembly 40, in certain embodiments and as best illustrated in FIGS. 3-6, includes an inner transparent sheet 50 and an outer transparent sheet 60 and an interlayer 70 disposed between the inner transparent sheet 50 and the outer transparent sheet 60.

Preferably, the inner and outer transparent sheets 50, 60 are panes of glass that are substantially transparent. However, in other embodiments, the inner and outer transparent sheets 50, 60 may be plastic, fiberglass, or any other suitable substantially transparent material. As defined herein, the term "substantially transparent", as used with respect to the transparent sheets 50 and 60, refers to a material that allows 90% or more of light transmission in a predefined wavelength range, such as the visible light range. The panes of glass are preferably automotive glass and, more specifically, soda-lime-silica glass. However, in other embodiments, the inner and outer transparent sheets 50, 60 may be plastic, fiberglass, or other suitable substantially transparent material.

Figure 4:
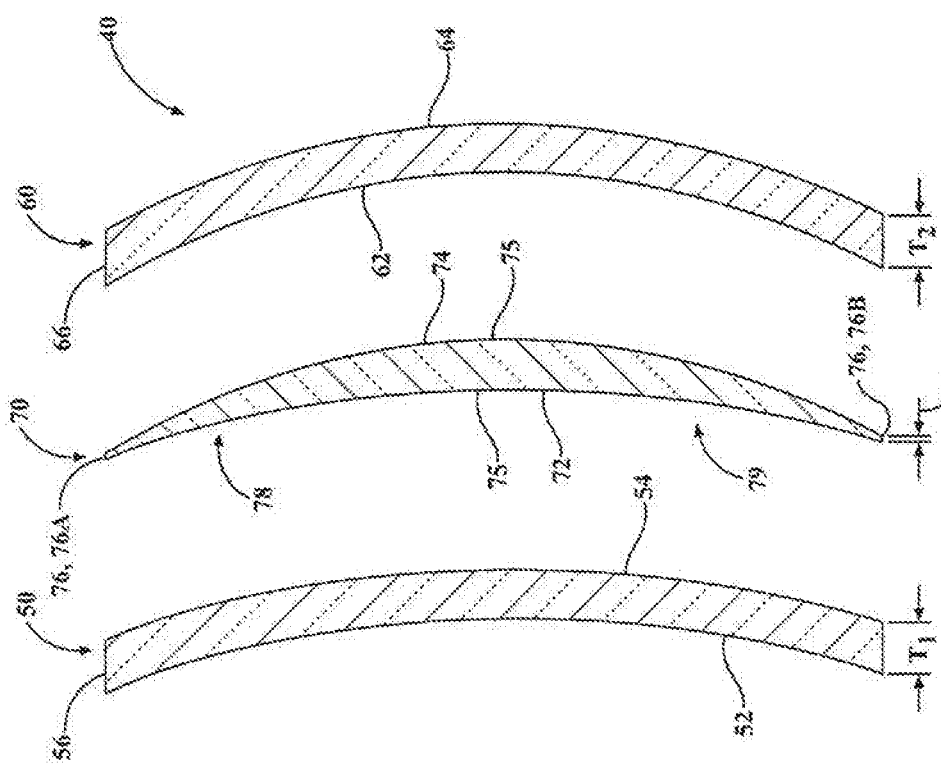
FIG. 4 is an exploded side perspective view of the window assembly of FIG. 4.

As best shown in FIG. 4, the inner transparent sheet 50 includes a first surface 52 and a second surface 54 and an edge 56 defined between the first and second surfaces 52, 54. The inner transparent sheet 50 has a thickness T1 measured in a direction normal to and between the first and second surfaces 52, 54. Preferably, the thickness T1 is uniform or substantially uniform.

Similarly, as also best shown in FIG. 4, the outer transparent sheet 60 includes a first surface 62 and a second surface 64 and an edge 66 defined between the first and second surfaces 62, 64. The outer transparent sheet 60 has a thickness T2 measured in a direction normal to and between the first and second surfaces 62, 64. Preferably, the thickness T2 is uniform or substantially uniform. The thickness T2 may be the same or different than T1.

As noted above, the window assembly 40 also includes an interlayer 70 disposed between the inner and outer transparent sheets 50, 60. Preferably, the interlayer 70 bonds the inner and outer transparent sheets 50, 60 and prevents the window assembly 40 from shattering upon impact.

As best shown in FIG. 4, the interlayer 70 includes a first surface 72 and a second surface 74 and an edge 76 defined between the first and second surfaces 72, 74. The edge 76 can be further defined as a top side edge 76A and a bottom side edge 76B. The interlayer 70 has a thickness T3 measured in a direction normal to and between the first and second surfaces 72, 74 (which also corresponds to the length of each respective edge 76A, 76B). As will be described in further detail below, the thickness T3 varies in at least certain distinct and separate portions of the interlayer 70 (shower as first portion 78 and second portion 79 in FIGS. 4-6 below) corresponding to the first and second portions 100, 200 of the window assembly 40, and hence the thickness of the window assembly 40 varies as a function of the variation in thickness T3 of the interlayer 70 within the first and second portions 78, 79.

Furthermore, the interlayer 70 typically is substantially transparent to light and includes a polymer or thermoplastic resin, such as polyvinyl butyral (PVB). However, other suitable materials for implementing the interlayer 70 may be utilized. Similar to the inner and outer transparent sheets 50, 60, the interlayer 70 is also substantially transparent to light, and accordingly the window assembly 40 assembled to include the interlayer 70 between the inner and outer transparent sheets 50, 60 is also substantially transparent to light. Accordingly, a driver or occupant of the vehicle 20 within the passenger compartment 24 may see through the window assembly 40 to the outside of the vehicle 20 when the window assembly 40 is installed within the front opening.

Figure 5:
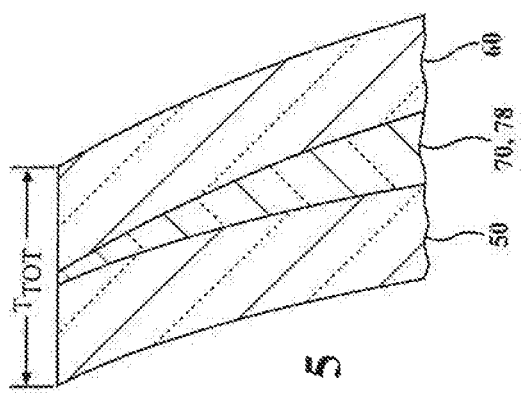
FIG. 5 is a section view of the window assembly of FIG. 3 taken along line 5-5.
Figure 6:
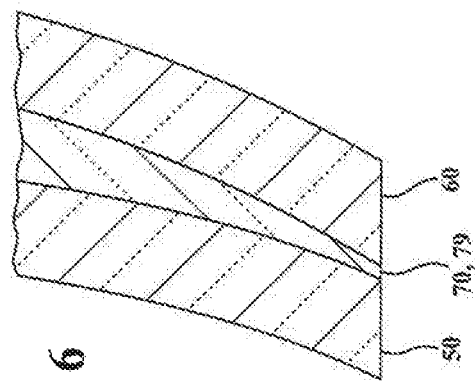
FIG. 6 is a section view of the window assembly of FIG. 3 taken along line 6-6.

When assembled, such as shown best in FIGS. 5 and 6, the first surface 72 of the interlayer 70 bonds to the second surface 54 of the inner transparent sheet 50, and a second surface 74 of the interlayer 70 bonds to an first surface 62 of the second transparent sheet 60 such that the interlayer 70 bonds to each of the inner and outer transparent sheets 50, 60 to form the window assembly 40.

Referring back to FIG. 3, the window assembly 40 (when assembled to include the interlayer 70 disposed between the inner and outer transparent sheets 50, 60) is substantially transparent, as defined above, and includes an upper edge 42, a lower edge 44, a first side edge 46 and a second side edge 48 each extending between the upper edge 42 and the lower edge 44, respectively, with the first side edge 46 being opposite the second side edge 48.

Each of the edges 42, 44, 46 and 48 may be further defined to include the respective edges 56, 66, 76 of the inner and outer transparent sheets 50, 60 and interlayer 70, respectively.

When the window assembly 40 is installed within the front opening of the vehicle frame 22, the upper edge 42 is positioned adjacent to the top portion 26, the lower edge 44 is positioned adjacent to the bottom portion 27, and the first and second side edges 46, 48 are positioned adjacent to a respective one of the pair of side portions 31, 29. As used herein, the term "upper" and "lower", as in upper and lower edge, are typically utilized to orient the window assembly 40 with respect to surface of the earth such that top portion 26 is higher in elevation from the surface of the earth than the bottom portion 27.

The term "inner" as in "inner transparent sheet" and "outer" as in "outer transparent sheet" refers to the respective orientation of the transparent sheets 50, 60 relative to a passenger compartment 24 of the vehicle 20 when the laminated window assembly 40 is installed within the front opening of the vehicle frame 22. Accordingly, when the window assembly 40 is installed within the front opening, the inner transparent sheet 50 is oriented towards and may partially define the passenger compartment 24 of the vehicle 20, hereas the outer transparent sheet 60 is oriented towards the outside of the vehicle 20.

As noted above, the vehicle 20 also includes a front-facing camera 23 that is positioned within the vehicle 20, such as within the passenger compartment 24, for receiving light transmissions from an object 350 located outside the vehicle 20 through a first portion 100 of the window assembly 40.

In this first portion 100 of the window assembly 40, as best shown in FIG. 4, the thickness T3 of the interlayer 70 varies between the first and second surfaces 72, 74 so as to define a first portion 78 of the interlayer 70 having a variable thickness profile. The variable thickness profile, as defined herein, is a thickness profile in which the thickness T3 of the interlayer 70 varies within the first portion 78 in any one direction. More typically, the thickness T3 of the interlayer 70 decreases within the first portion 78 in any one direction, and even more typically decreases in thickness in a continuous manner, which is also commonly referred to as wedge-shaped thickness profile.

The first portion 78 of the interlayer 70, which includes the aforementioned variable thickness profile, functions to reduce or eliminate transmitted double images, or ghost images, of light transmissions received by the front-facing camera 23 through the first portion 100 (and hence the first portion 78) of the window assembly 40 from outside the vehicle 20.

The location of the first portion 100 within the window assembly 40, and hence the location of first portion 78 within the interlayer 70, is dependent upon the positioning of the front-facing camera 23 relative to the window assembly 40. In most instances, the positioning of the front-facing camera 23 is within the passenger compartment 24 in a location such that it does not impede the line of sight of the driver of the vehicle 20.

In certain instances, wherein the front-facing camera 23 is positioned near the top of the passenger compartment 24, such as wherein the camera 23 is included within or adjacent to the rear view mirror assembly (shown generally as 87 in FIG. 2), the first portion 78, 100 is positioned closer to the upper edge 42 than to the lower edge 44 of the window assembly 40 to correspond to the positioning of the front-facing camera 23. In certain related instances, the first portion 78, 100 extends to the upper edge 42. In certain of these instances, the thickness T3 of the first portion 78 of the interlayer 70 varies in thickness in a direction towards the upper edge 42. In certain instances, the variation in thickness T3 of the first portion 78 of the interlayer 70 is such that the thickness decreases in a direction towards the upper edge 42, and in yet still further instances the decrease in thickness is in a consistently decreasing thickness in direction towards the upper edge 42, and hence forms a wedge-shaped thickness profile within the first portion 78 of the interlayer 70 in direction towards the upper edge 42.

In still other instances, such as wherein the front-facing camera 23 is included within or adjacent to the dashboard 28 of the vehicle 20 (such as when the vehicle does not include a head up display), the first portion 78, 100 is positioned closer to the lower edge 44 than to the upper edge 42 of the window assembly 40. In certain related instances, the first portion 78, 100 extends to the lower edge 44. In certain instances, the thickness T3 of the first portion 78 of the interlayer 70 varies in a direction towards the lower edge 44. In other instances, the variation in thickness T3 of the first portion 78 of the interlayer 70 is such that the thickness decreases in a direction towards the lower edge 44, and in yet still further instances the decrease in thickness is in a consistently decreasing thickness in direction towards the bottom portion 27 of the vehicle frame 22 (and hence again forms a wedge-shaped thickness profile within the first portion 78 of the interlayer 70 in direction towards the bottom portion 27 of the vehicle frame 22).

In still other instances, such as wherein the front-facing camera 23 is included within or adjacent to the driver's side window shade 83 of the vehicle 20, the first portion 78, 100 is positioned closer to the second side edge 48 than to the first side edge 46 of the window assembly 40 such that the first portion 78, 100 generally corresponds to the line of sight of the driver of the vehicle. In certain related instances, the first portion 78, 100 extends to the second side edge 48. In certain related instances, the first portion 78, 100 also extends to the upper edge 42. In certain related instances, the first portion 78, 100 extends to the upper edge 42. In certain of these instances, the thickness 13 of the first portion 78 of the interlayer 70 varies in thickness in a direction towards the upper edge 42. In certain instances, the variation in thickness 13 of the first portion 78 of the interlayer 70 is such that the thickness decreases in a direction towards the upper edge 42, and in yet still further instances the decrease in thickness is in a consistently decreasing thickness towards the upper edge 42 (and hence forms a wedge-shaped thickness profile within the first portion 78 of the interlayer 70 in direction towards the upper edge 42).

Alternatively, the thickness T3 of the first portion 78 of the interlayer 70 varies in thickness in a direction towards the second side edge 48. In certain instances, the variation in thickness T3 of the first portion 78 of the interlayer 70 is such that the thickness decreases in a direction towards the first side edge 46, and in yet still further instances the decrease in thickness is in a consistently decreasing thickness in direction towards the second side edge 48 (and hence again forms a wedge-shaped thickness profile within the first portion 78 of the interlayer 70 in direction towards the second side edge 48). In yet still further instances, the thickness T3 of the first portion 78 of the interlayer 70 varies in thickness in a direction towards both the upper edge 42 and the second side edge 48. In certain instances, the variation in thickness T3 of the first portion 78 of the interlayer 70 is such that the thickness decreases in thickness in a direction towards both the upper edge 42 and the second side edge 48, and in yet still further instances the decrease in thickness is in a consistently decreasing thickness in direction towards the upper edge 42 and the second side edge 48 (and hence forms a wedge-shaped thickness profile within the first portion 78 of the interlayer 70 in direction towards the upper edge 42 and the second side edge 48).

In yet still other instances, such as wherein the front-facing camera 23 is included within or adjacent to the passenger's side window shade 85 of the vehicle 20, the first portion 78, 100 is positioned closer to the first side edge 46 than to the second side edge 48 of the window assembly 40 such that the first portion 78, 100 generally corresponds to the line of sight of the passenger of the vehicle 20 sitting in the front passenger seat opposite the driver's side seat. In certain related instances, the first portion 78, 100 extends to the first side edge 46. In certain of these instances, the thickness T3 of the first portion 78 of the interlayer 70 varies in thickness in a direction towards the upper edge 42. In certain instances, the variation in thickness 13 of the first portion 78 of the interlayer 70 is such that the thickness decreases in a direction towards the upper edge 42, and in yet still further instances the decrease in thickness is in a consistently decreasing thickness in direction towards the upper edge 42 (and hence forms a wedge-shaped thickness profile within the first portion 78 of the interlayer 70 in direction towards the upper edge 42). Alternatively, the thickness T3 of the first portion 78 of the interlayer 70 varies in thickness in a direction towards the first side edge 46. In certain instances, the variation in thickness T3 of the first portion 78 of the interlayer 70 is such that the thickness decreases in a direction towards the first side edge 46, and in yet still further instances the decrease in thickness is in a consistently decreasing thickness in direction towards the first side edge 46 (and hence forms a wedge-shaped thickness profile within the first portion 78 of the interlayer 70 in direction towards the first side edge 46). In yet still further instances, the thickness 13 of the first portion 78 of the interlayer 70 varies in thickness in a direction towards both the upper edge 42 and the first side edge 46. In certain instances, the variation in thickness T3 of the first portion 78 of the interlayer 70 is such that the thickness decreases in a direction towards both the upper edge 42 and the first side edge 46, and in yet still further instances the decrease in thickness is in a consistently decreasing thickness in direction towards the upper edge 42 and the first side edge 46 (and hence forms a wedge-shaped thickness profile within the first portion 78 of the interlayer 70 in direction towards the upper edge 42 and the first side edge 46).

In even further instances, the first portion 78, 100 is positioned equidistant from the first and the second side edge 46, 48 of the window assembly 40. In certain of these instances, the thickness T3 of the first portion 78 of the interlayer 70 varies in thickness in a direction towards the upper edge 42. In certain instances, the variation in thickness 13 of the first portion 78 of the interlayer 70 is such that the thickness decreases in a direction towards the upper edge 42, and in yet still further instances the decrease in thickness is in a consistently decreasing thickness in direction towards the upper edge 42 (and hence forms a wedge-shaped thickness profile within the first portion 78 of the interlayer 70 in direction towards the upper edge 42).

Even still further, the first portion 78, 100 may be positioned closer to the upper edge 42 than to the lower edge 44 while also being positioned closer to, equidistant from, or further from the first side edge 46 relative to the second side edge 48. In certain of these instances, the thickness T3 of the first portion 78 of the interlayer 70 varies in thickness in a direction towards the upper edge 42, and in yet still further instances the decrease in thickness is in a consistently decreasing thickness in direction towards the upper edge 42, and in certain of these instances the thickness T3 of the first portion 78 of the interlayer 70 decreases in thickness in a consistently decreasing thickness in direction towards the upper edge 42 (and hence forms a wedge-shaped thickness profile within the first portion 78 of the interlayer 70 in direction towards the upper edge 42).

As noted above, the first portion 78 of the interlayer 70, and hence the first portion 100 of the window assembly 40, is designed so as to reduce or eliminate the transmission of a double image, to the front-facing camera 23. The transmitted double image (also referred to as a secondary image or ghost image) occurs when light transmissions (light rays) from an object 350 take different paths from outside the vehicle 20 and through the first portion 100 of the window assembly 40 to the front-facing camera 23.

To reduce the effects of the double image, the characteristics of the thickness profile within the first portion 78 of the interlayer 70 are varied such that the double images transmitted to the front-facing camera 23 from the object 350 are minimized or eliminated. As noted above, this is done in most instances by varying the thickness of the first portion 78 of the interlayer 70 in any one direction such that the rays of light associated with the secondary image overlap and extend in the same direction with the rays of light associated with the primary image travelling from the inner edge 52 of the inner transparent sheet 50 to the front-facing camera 23. In further embodiments, as also noted above, the variation in thickness of the first portion 78 of the interlayer 70 is accomplished by decreasing the thickness of the interlayer 70 in any one direction, and in more specific embodiments by decreasing the thickness of the interlayer 70 in any one direction at a constant rate to form a wedge-shaped thickness profile.

Figure 7:
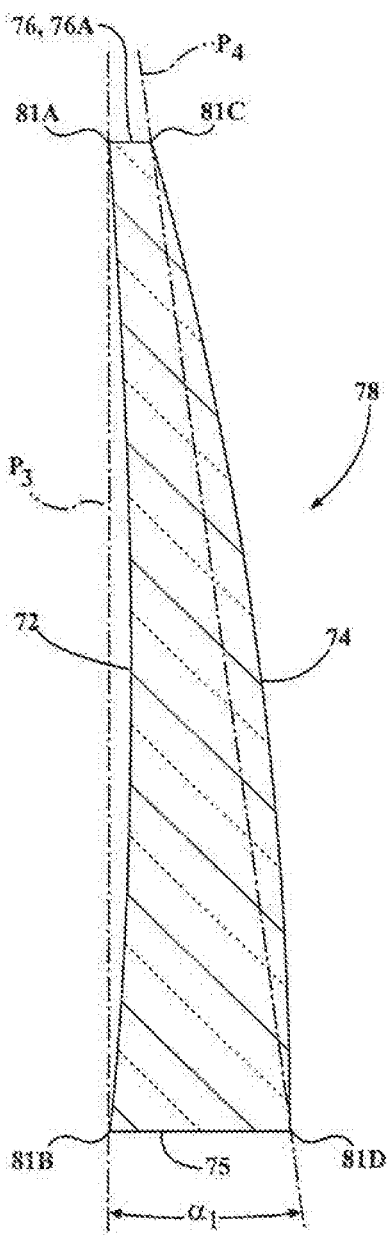
FIG. 7 is a perspective side view of the interlayer of FIGS. 3-6 having a wedge angle $\alpha_1$.

As shown in FIG. 7, the decrease in thickness profile of the first portion 78 can be defined by a first wedge angle $\alpha_1$, which measures the difference in angle between a plane P3 and a plane P4. The plane P3 is defined by a line at one end that intersects the edge 76, 76A at an endpoint 81A corresponding to the intersection of the edge 76, 76A and first surface 72, and at the other end intersects the middle portion 75 at an endpoint 81B on the first surface 72. The plane P4 is similarly defined by a line intersecting the edge 76, 76A at an endpoint 81C corresponding to the intersection of the edge 76 and second surface 74, and intersecting at the middle portion 75 by an endpoint 81D on the second surface 74. Notably, the wedge angle at is not meant to imply the interlayer 70 has a constantly and consistently changing thickness from the edge 76, 76A to the middle portion 75, although in certain instances this may occur. Still further, as one of ordinary skill would appreciate, if the thickness of the interlayer 70 is constant, planes P3 and P4 would never intersect, and hence never form a wedge angle at.

As also noted above, in certain embodiments, the vehicle 20 may also include a head up display unit 25 for displaying a virtual image on a second portion 200 of the window assembly 40. In this second portion 200 of the window assembly 40, as shown best in FIG. 6, the thickness T3 of the interlayer 70 varies between the first and second surfaces 72, 74 so as to define a second portion 79 of the interlayer 70 having a second variable thickness profile. The second variable thickness profile, as defined herein, is a thickness profile in which the thickness T3 of the interlayer 70 varies within the second portion 79 of the interlayer 70 in any one direction. More typically, the thickness T3 of the interlayer 70 decreases within the second portion 79 in any direction, and even more typically decreases in thickness in a continuous manner.

Figure 8:
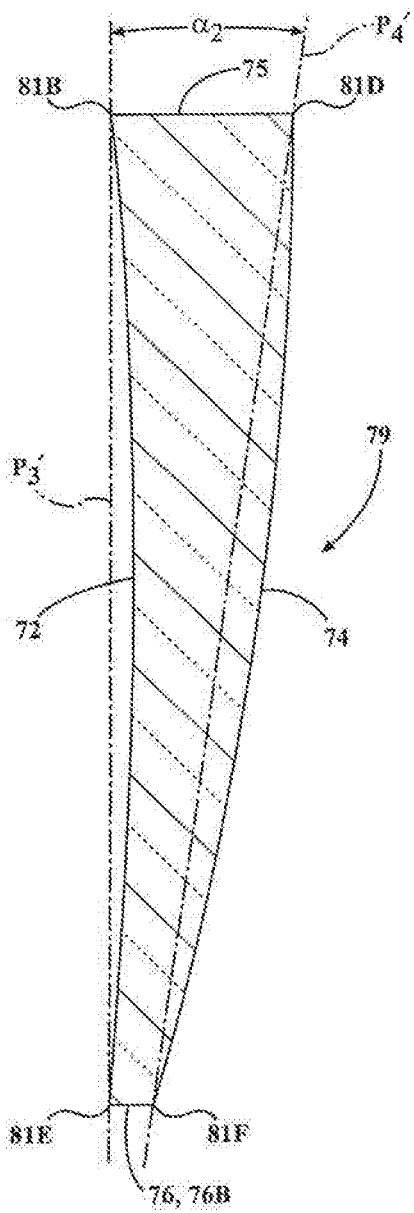
FIG. 8 is a perspective side view of the interlayer of FIGS. 3-6 having a wedge angle $\alpha_2$.

Similar to the first variable thickness profile of the first portion 78 defined by a first wedge angle at, the decrease in thickness of the second variable thickness profile of the second portion 79 can also be defined by a second wedge angle $\alpha_2$, which is illustrated in FIG. 8. As shown in FIG. 8, the decrease in wedge thickness profile of the second portion 79 can be defined by a second wedge angle $\alpha_2$, which measures the difference in angle between a plane P3' and a plane P4'. The plane P3' is defined by a line at one end that intersects the edge 76, 76B at an endpoint 81F, corresponding to the intersection of the edge 76 and first surface 72, and at the other end intersects the middle portion 75 at an endpoint 81B on the first surface 72. The plane P4' is similarly defined by a line intersecting the edge 76, 76B at an endpoint 81F corresponding to the intersection of the edge 76 and second surface 74, and intersecting at the middle portion 75 by an endpoint 81D on the second surface 74. Notably, the wedge angle $\alpha_2$ is not meant to imply the interlayer 70 has a constantly and consistently changing thickness from the edge 76, 76B has a constantly and consistently changing thickness from the edge 76, 76B to the middle portion 75, although in certain instances this may occur. Still further, as one of ordinary skill would appreciate, if the thickness of the interlayer 70 is constant, planes P3' and P4' would never intersect, and hence never form a wedge angle $\alpha_2$.

The second portion 79 of the interlayer 70, which is distinct from the first portion 78 of the interlayer 70 which includes the aforementioned second variable thickness profile, functions to reduce or eliminate transmitted double images (again referred to alternatively as ghost images or secondary images), of light displayed as a virtual image on the second portion 200 of the window assembly 40 as viewed by the driver of the vehicle seated within the passenger compartment 24, and in particular seated on the driver's side seat positioned within the passenger compartment 24. These virtual images are displayed from light being transmitted from the head up display unit 25 to the second portion 200 of the window assembly 40.

In certain embodiments of the present invention, and in particular embodiments including both the front-facing camera 23 and head up display 25, the first portion 100 and second portion 200 are separated from each other and therefore define distinct portions of the window assembly 40. In these embodiments, the first portion 78 and second portion 79 of the interlayer are also separate and distinct portions of the interlayer 70, although the first and second portions 78, 79 may abut one another or be separated from one another in the interlayer 70 and still be classified and separate and/or distinct.

Moreover, the respective variable thickness profiles of these separate and distinct portions 78, 79 of the interlayer 70 may be oriented so as to reduce or minimize the effects of double images from light transmissions received by the front-facing camera 23 from objects 350 through the first portion 100 of the window assembly 40 while simultaneously reducing or minimizing the effects of double images of the virtual image displayed on the second portion 200 of the window assembly 40 as viewed by the driver of the vehicle 20 seated within the passenger compartment 28.

Figure 3:
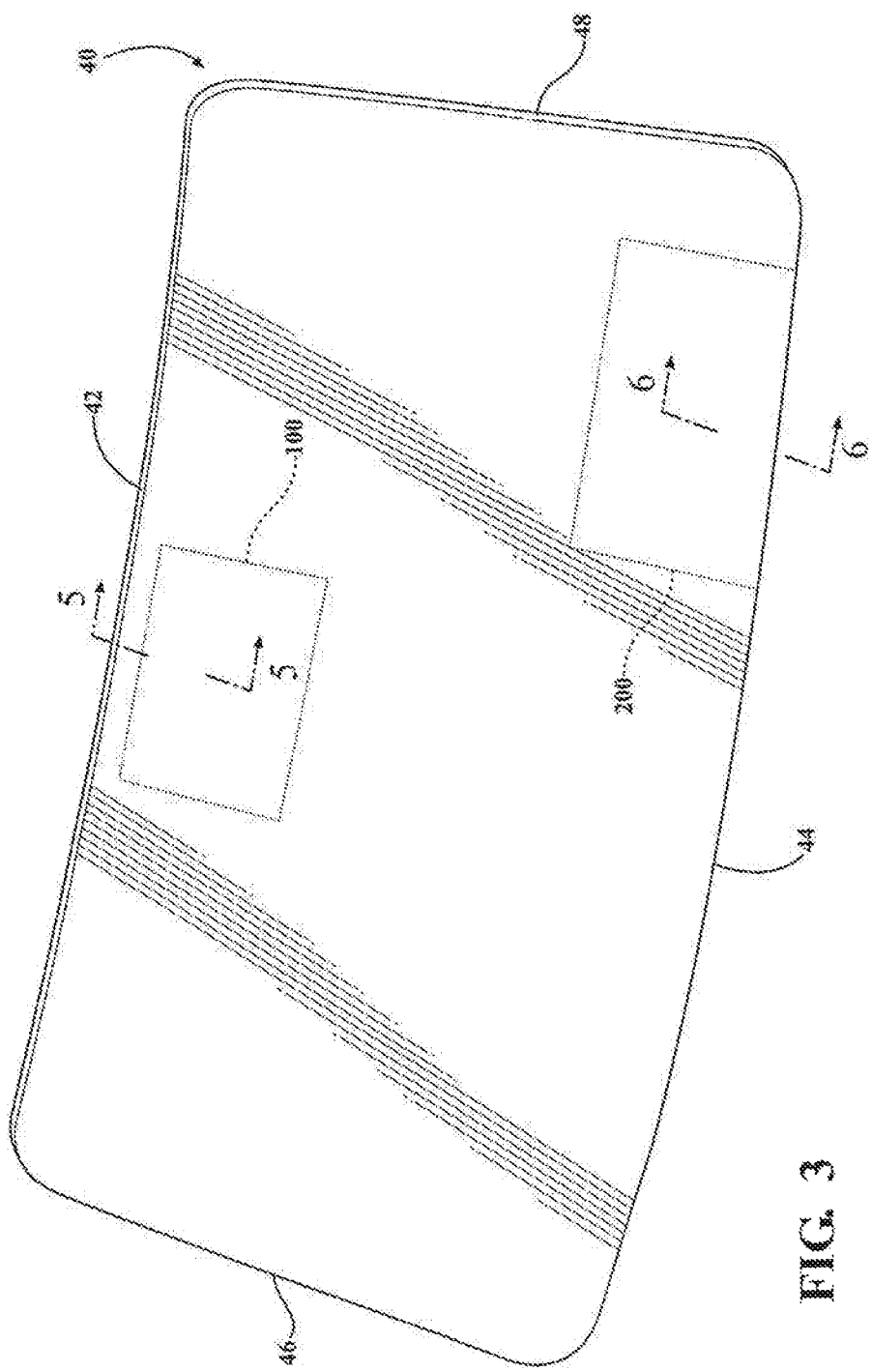
FIG. 3 is a perspective view of the window assembly of FIG. 1.

Thus, for example, and as best shown in FIGS. 4-8, the relative thickness of the first variable portion of the first portion 78 may decrease in thickness in a direction from the bottom edge 44 to the top edge 42, whereas the relative thickness of the second variable portion of the second portion 79 may decrease in thickness in a direction from the top edge 42 to the bottom edge 44. This typically occurs when the front-facing camera 23 is positioned for receiving light transmissions through the first portion 100 of the window assembly closer to the top edge 42 than to the bottom edge 44, and where the head up display 25 is positioned such that the transmitted image received from the second portion 200 from the head up display 25 as viewed by the driver of the vehicle 20 is located closer to the bottom edge 44 than the top edge 42 of the window assembly 40 (i.e., wherein the first portion 100 is located above the second portion 200 such as shown in FIG. 3).

Most preferably, such as shown in FIG. 4, the interlayer 70 is formed wherein the thickness of the interlayer 70 increases in thickness from the bottom edge 76, 76B to a middle portion 75 and then decreases in thickness from the middle portion 75 to the top edge 76, 76A. Even more preferably, the thickness change from the bottom edge 76, 76B to the middle portion 75 is consistent so as to correspond to the first wedge angle at of the first portion 78 as described and illustrated in FIG. 7. Similarly, the thickness change from the middle portion 75 to the top edge 76, 76A is also consistent so as to define the second wedge angle $\alpha_2$ of the second portion 79 of the interlayer 70 as described and illustrated in FIG. 8. In these embodiments, the middle portion 75 may define the periphery of both the first portion 78 and second portion 79 of the interlayer 70, or alternatively may define a transitional area having uniform thickness between the first portion 78 and second portion 79.

The amount of the wedge angle $\alpha_1$ or $\alpha_2$, and hence the shape of the first portion 78 and/or the second portion 79 of the interlayer 70, is influenced by many factors of the vehicle 20 and the window assembly 40, including but not limited to the installation angle $\theta_{install}$ of the window assembly 40, the shape of the window assembly (whether flat or curved), and the relative respective thicknesses T1, T2 of the inner and outer transparent sheets 50, 60. For example, the wedge angle αt is optimized based on the driver's eye position, the virtual image position of the second portion 200 of the window assembly 40, the HUD unit 25 positioning, the installation angle ° install of the window assembly 40, and the curvature of the window assembly 40 defined along the first surface 52 of the inner transparent sheet 50 and/or along the second surface 64 of the outer transparent sheet 60.

A first factor which may influence the amount of the wedge angle $\alpha_1$ or $\alpha_2$ of the first portion 78 and/or the second portion 79 of the interlayer 70 is the installation angle $\theta_{install}$ (shown in FIG. 9 below) of the window assembly 40 within the vehicle. The installation angle ° install, refers to the angle αt which the window assembly 40 is installed within the vehicle frame 22 relative a horizontal plane extending in a direction perpendicular to the ground. Generally speaking, the installation angle $\theta_{install}$ of the window assembly 40 within the frame 22 varies depending upon the make and model of the land vehicle 20 on which it is installed (when installed on a land vehicle 20). In most embodiments, the installation the installation angle $\theta_{install}$ of the window assembly 40 is between 15 and 90 degrees (i.e., vertical), and more typically is from 25 to 40 degrees, such as 30 degrees. In vehicles 20 in which the installation angle $\theta_{install}$ is close to 90 degrees (i.e., close to vertical), the wedge angle $\alpha_1$ or $\alpha_2$ of the first portion 78 and/or the second portion 79 is small. As the installation angle $\theta_{install}$ decreases towards 15 degrees moves from vertical towards horizontal), generally speaking, the wedge angle $\alpha_1$ or $\alpha_2$ of the first portion 78 and/or the second portion 79 correspondingly increases.

Another factor that may influence the amount of the wedge angle $\alpha_1$ or $\alpha_2$ of the first portion 78 and/or the second portion 79 is the shape of the window assembly 40 as defined along the first surface 52 of the inner transparent sheet 50 and/or the second surface 64 of the outer transparent sheet 60. More specifically, the relative radius of curvature of the window assembly 40 can influence the amount of the wedge angle $\alpha_1$ or $\alpha_2$ of the first portion 78 and/or the second portion 79 of the window assembly 40. The radius of curvature of the window assembly 40 is typically measured as the curvature of the window assembly 40 on the first surface 52 of the inner transparent sheet 50 between the first side edge 46 and the second side edge 48, and/or between the upper edge 44 and lower edge 42. Alternatively, the radius of curvature of the window assembly 40 may measured as the curvature of the window assembly 40 on the second surface 64 of the outer transparent sheet 60 between the first side edge 46 and the second side edge 48, and/or between the upper edge 44 and lower edge 42. In certain instances, the wedge angle $\alpha_1$ or $\alpha_2$ of the first portion 78 and/or the second portion 79 may vary as the amount of curvature decreases from generally flat window assembly 40 having an infinite or large radius of curvature (i.e., having a generally flat surface along the first surface 52 of the inner transparent sheet 50 or and/or along the second surface 64 of the outer transparent sheet 60) to a substantially curved window assembly 40 having a smaller radius of curvature in any one relative direction.

Still further, another factor that may influence the amount of the wedge angle $\alpha_1$ or $\alpha_2$ of the first portion 78 and/or the second portion 79 is the relative thickness $T_{tot}$ (shown in FIG. 5) of the respective window assembly 40, with $T_{tot}$ measured in a direction normal to the first surface 52 of the inner transparent sheet 50 and in a direction normal to the second surface 64 of the outer transparent sheet 60. In general, a window assembly having a thicker inner and/or outer transparent sheet 50 or 60 requires a greater the wedge angle δ of the first portion 78 and/or the second portion 79 of the window assembly 40.

Even still further, another factor that may influence the amount of the wedge angle $\alpha_1$ of the first portion 78 of the window assembly 40 is the relative distance between inner surface 52 of the window assembly 40 and the front facing camera 23. Relatedly, a factor that may influence the amount of the wedge angle $\alpha_2$ of the second portion 79 of the window assembly 40 is the relative distance between inner surface 52 of the window assembly 40 and the driver 150 of the vehicle 20.

In certain embodiments, the wedge angle $\alpha_1$ of the first portion 78 of the window assembly 40, when used in conjunction with the front facing camera 23, may vary between greater than 0 and 1 milliradian (mrad), such as from 0.2 to 0.4 mrad, such as 0.3 mrad.

In certain embodiments, the wedge angle $\alpha_2$ of the second portion 79 of the window assembly 40, such as when the second portion 79 is used in conjunction with the head up display 25, may vary between greater than 0 and 1 milliradian (mrad), such as from 0.4 to 0.8 mrad, such as 0.6 mrad.

Figure 9:
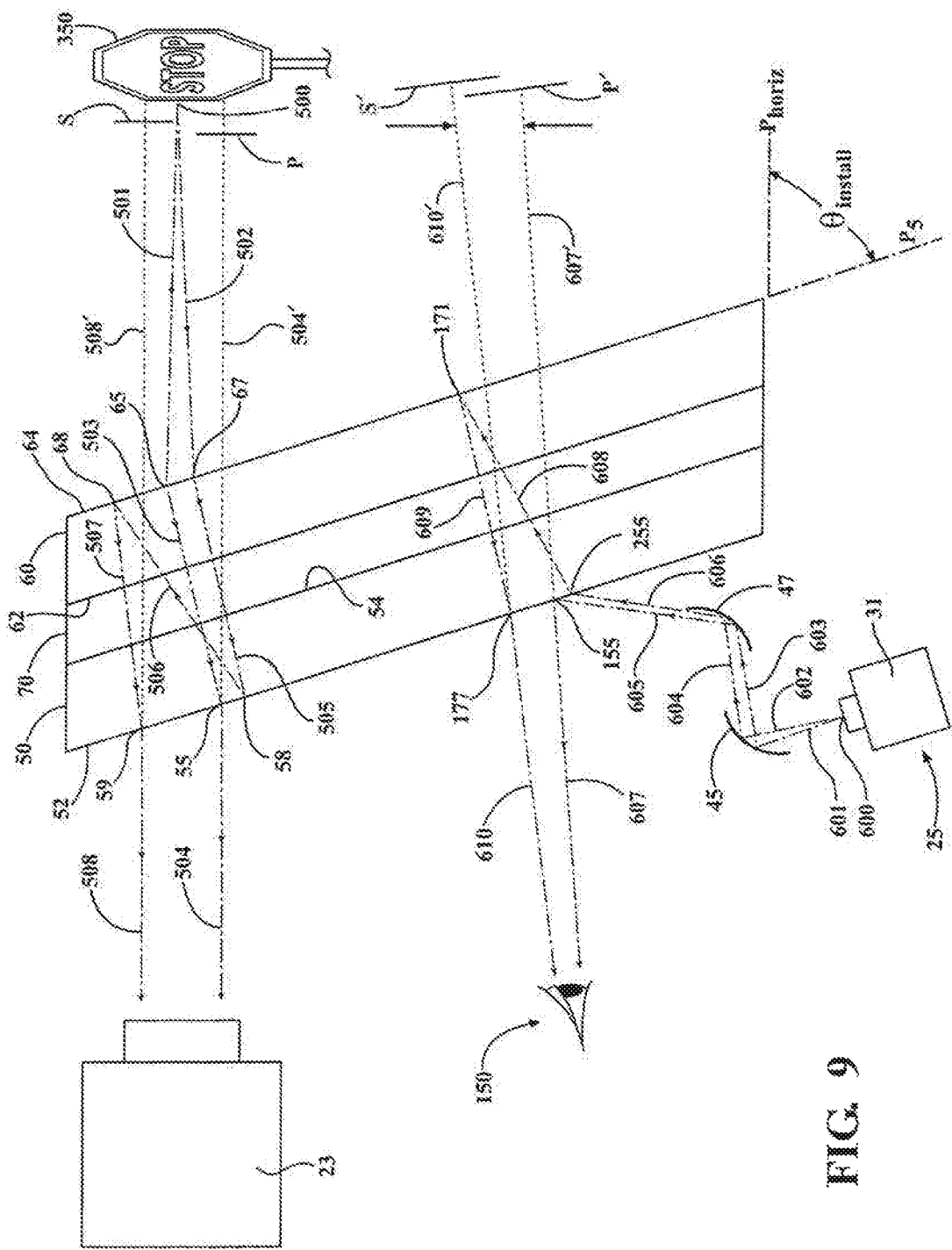
FIG. 9 is a perspective illustrating the path of light rays from an object to a front-facing camera through a window assembly having a constant thickness interlayer.
Figure 10:
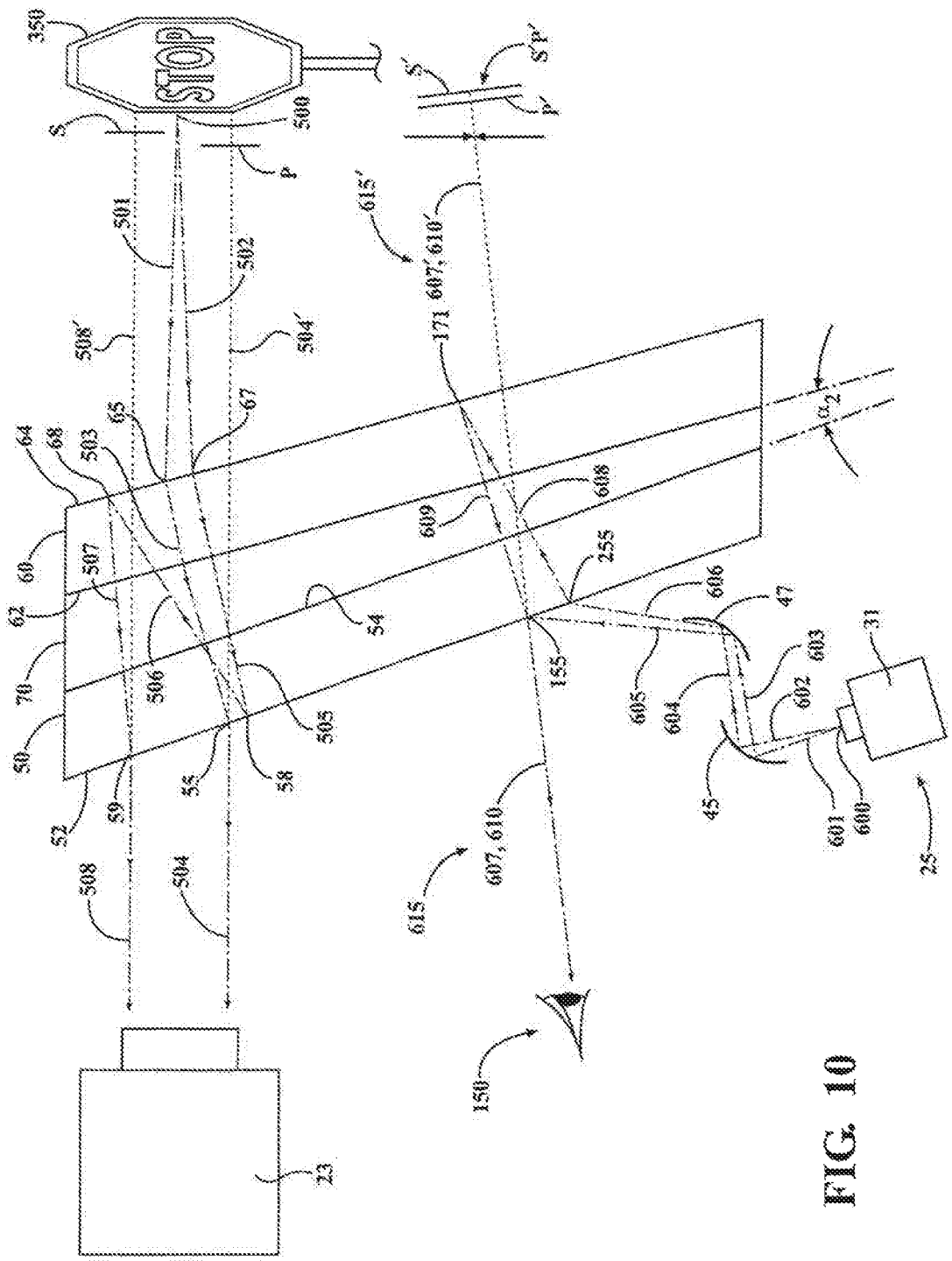
FIG. 10 is a perspective view illustrating the path of light rays from an object to a front-facing camera through a window assembly have an interlayer having a single wedge-shaped thickness profile.
Figure 11:
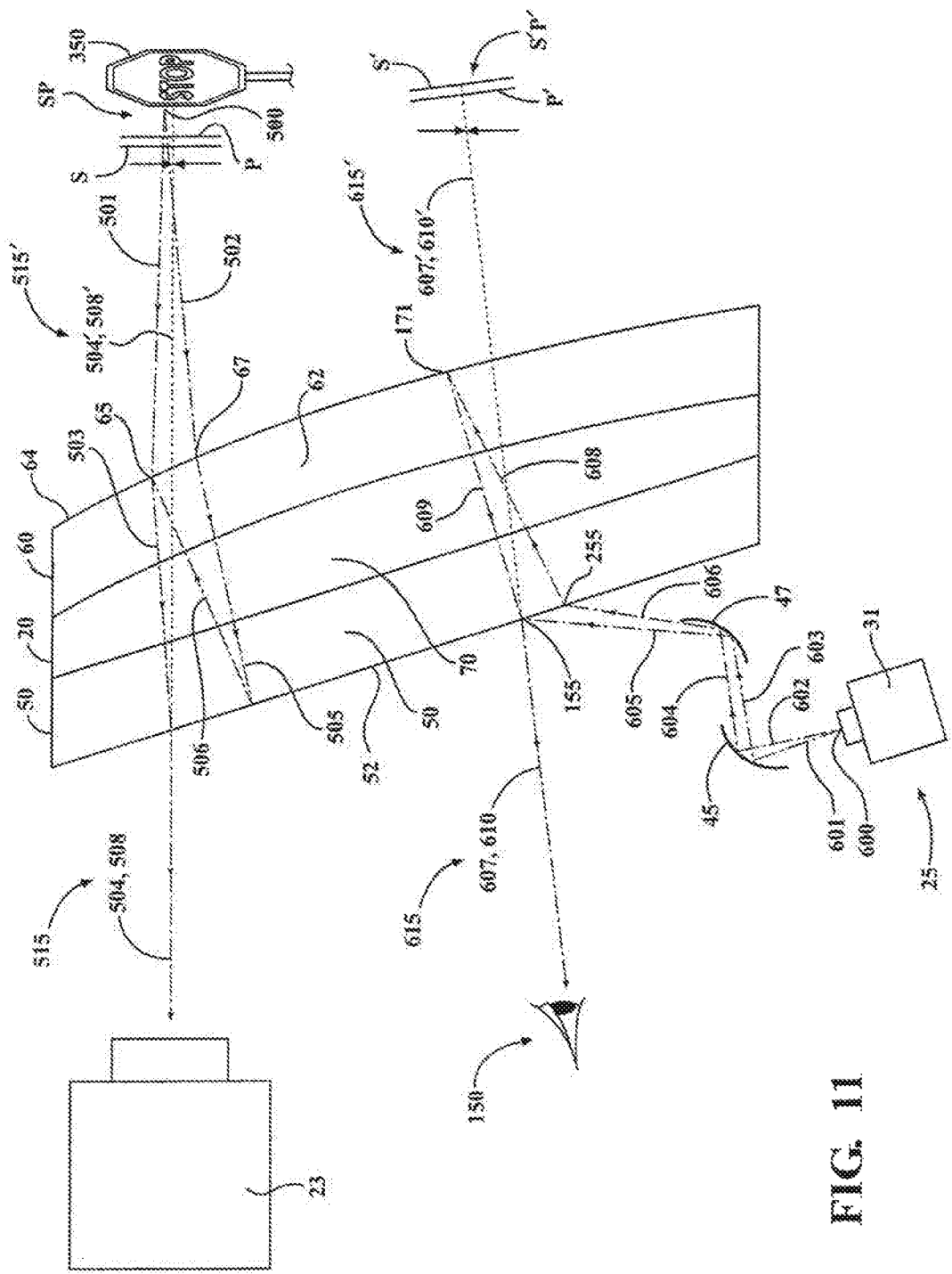
FIG. 11 is a perspective view illustrating the path of light rays from an object to a front-facing camera through a window assembly according to one embodiment of the present invention.

The effect of the wedge angles $\alpha_1$ and $\alpha_2$ for a vehicle 20 (hence having a distinct first and second portion 100, 200) on a window assembly 40 having both a front-facing camera 23 and a head up display 25 is best illustrated in FIGS. 9-11. For the purposes of ease of description, the window assembly 40 shown in FIGS. 9-11 has no radius of curvature (defined along both the first surface 52 of the inner transparent sheet 50 and the second surface 64 of the outer transparent sheet 60) and the inner and outer transparent sheets 50, 60 have a constant thickness T1, T2. In addition, in each of FIGS. 9-11, the window assembly 40 has been installed in the vehicle frame 22 at a predefined angle $\theta_{install}$ that is greater than 0 and less than or equal to 90 degrees (i.e., not horizontal). Still further, the effect of the wedge angles $\alpha_1$ and $\alpha_2$ for a vehicle 20 is illustrated with respect to a pair of divergent light rays, as opposed to more than two divergent light rays, emitted from a single point of the reference device (either the object 350 or the projector 31 of the HUD unit 25) as will be described in further detail below. Still further, in each of FIGS. 9-11, the relative distance between the driver 150 of the vehicle 22 and the inner surface 52 of the window assembly 40 is constant, as is the relative distance between front facing camera 23 and the inner surface 52 of the window assembly 40.

In FIG. 9, the interlayer 70 also has a uniform thickness T3 along its length between the top and bottom edges 76, while in FIG. 10 the interlayer 70 decreases in thickness at a consistent rate (so as to define a wedge angle $\alpha_2$) from the top to the bottom edge 76. In FIG. 11, which corresponds to the present invention as illustrated, for example, in FIGS. 4-8, the interlayer 70 increases in thickness from the bottom edge 76 to the middle portion 75 so as to define second portion 79 having the second wedge angle $\alpha_2$, and then decreases in thickness from the middle portion 75 to the top edge 76 so as to define the first portion 78 having the first wedge angle $\alpha_1$.

Referring first to FIG. 9, a pair of light rays emitted from a single point 500 on the object 350 travel along divergent paths 501 and 502 towards the window assembly 40.

The first ray of light traveling along path 501 contacts the second surface 64 of the outer transparent sheet 60 at point 65, wherein it is refracted through the second surface 64 along path 503 through the first surface 62, the interlayer 70, and the it transparent sheet 50 to the first surface 52. The light ray traveling along path 503 contacts the first surface 52 of the inner transparent sheet 50 at point 55 and is refracted through the first surface 52 along path 504 towards the front facing camera 23.

At the same time, the second ray of light traveling along path 502 contacts the second surface 64 of the outer transparent sheet 60 at point 67, wherein it is refracted through the second surface 64 along path 505 through the first surface 62, the interlayer 70, and the inner transparent sheet 50 to the first surface 52. The light ray traveling along path 505 contacts the first surface 52 at point 58 and is reflected back towards the outer transparent sheet 60 along path 506. The light ray along path 506 travels through inner transparent sheet 50, the interlayer 70, and the outer transparent sheet 60 and contacts the second surface 64 of the outer transparent sheet at point 68, wherein it is reflected back towards the inner transparent sheet 50 along path 507 through the first surface 62, the interlayer 70, and the inner transparent sheet 50 to the first surface 52. The light ray traveling along path 507 contacts the first surface 52 of the inner transparent sheet 50 at point 59 and is refracted through the first surface 52 along path 508 towards the front facing camera 23.

As illustrated in FIG. 9, the light rays traveling along paths 504 and 508 towards the front facing camera 23 are offset from one another. The extension of the light rays along paths 504, 508 back through the window assembly creates virtual light ray paths 504' and 508' and appear as a primary image P and an offset secondary image S as perceived by the front facing camera 23.

As also shown in FIG. 9, light rays emitted from a single point 600 on the projector 31 travel along divergent paths 601, 602 towards the series of deflection mirrors 43, here shown as mirrors 45 and 47. The light rays traveling along paths 601, 602 are reflected by, the mirror 45 and then travel along paths 603, 604 towards the mirror 47. The light rays traveling along paths 603, 604, are then reflected off the mirror 47 towards the inner transparent sheet 50 and travel along paths 605, 606. The light rays traveling along path 605 then contact the first surface 52 of the inner transparent sheet 50 at point 155, wherein they are reflected and travel towards the driver 150 of the vehicle 20 along path 607.

At the same time, the light rays traveling along path 606 contacts the inner transparent sheet 50 at point 255 and is refracted and travels through the interlayer 70 and outer transparent sheet 60 along path 608. The light rays traveling along path 608 contact the second surface 64 of the outer transparent layer 60 at point 171, wherein they are reflected back through the interlayer 70 and inner transparent sheet 50 along path 609 and contact the first surface of the inner transparent sheet 50 at point 177. The light rays are then refracted and travel towards the driver 150 of the vehicle along path 610. The extension of the light rays along paths 607, 610 back through the window assembly 40 creates virtual light ray paths 607' and 610' appear as a primary image P' and an offset secondary image S' as perceived by the driver 150 of the vehicle 20.

In FIG. 10, the window assembly 40 includes an interlayer 70 that continually increases in thickness in a consistent manner from the bottom edge 76 to the top edge 76 so as to define a wedge angle profile $\alpha_2$. In FIG. 10, the wedge angle profile $\alpha_3$ is configured to reduce or minimize the effects of double imaging of the virtual image created by the head up display 25. Accordingly, as opposed to FIG. 9, wherein the light rays traveling along paths 607, 610 towards the driver 150 of the vehicle 20 are distinct and not overlapping and therefore appear as a primary image P and offset secondary image S as perceived by the driver 150 of the vehicle 20, the wedge angle profile $\alpha_3$ allows the light rays traveling on paths 607, 610 to overlap and therefore define a single ray of light 615, and accordingly the virtual light paths 607', 610' extending from these overlapped light paths 607, 610 overlap as a single virtual ray 615' such that the primary virtual image P' and the secondary virtual image S' appear as a single virtual image S'P' by the driver 150 of the vehicle 20.

However, while the wedge angle profile $\alpha_2$ of FIG. 10 reduces the effects of double imaging for light transmissions for the driver 150 of the vehicle 20, the opposite effect is true for light transmissions received by the front-facing camera 23. In fact, as also shown in FIG. 10, the light rays traveling along paths 504, 508 are even more divergent than the same light rays paths 504, 508 in FIG. 9, and hence the double imaging effect to the front-facing camera 23 is more pronounced than in the embodiment of FIG. 9. Stated another way, the offset between the primary virtual image P and secondary virtual image S corresponding to paths 504', 508' is more pronounced in FIG. 10 than the offset between the primary virtual image P and secondary virtual image Sin FIG. 9.

By contrast, when the wedge thickness profile is utilized and is calibrated properly with two distinct wedge thickness profiles $\alpha_1$, $\alpha_2$ corresponding to the first and second portions 100, 200 as described and illustrated in the embodiment as illustrated in FIGS. 7 and 8 (unlabelled but as also shown in FIG. 11), the pathways of the two light rays that are initially emitted from the object 350 at a single point 500 along paths 501, 502 and eventually travel to the front facing camera 23 along paths 504, 508 overlapping as a single light ray path 515, and accordingly the virtual extension of these light paths 504', 508' overlap as a single virtual light path 515' such that the primary virtual image P and the secondary virtual image S appear as a single virtual image SP by the front facing camera 23.

Accordingly, by calibrating the wedge angles $\alpha_1$ and $\alpha_2$ of the first portion 78 and second portion 79 of the interlayer 70 as in FIG. 11 to a desired wedge angle, virtual primary image P received by the front-facing camera 23 through the first portion 100 of the window assembly 40 and corresponding virtual primary image P' from the head up display unit 25 viewed by the driver 150 of the vehicle 20 through the second portion 200 of the window assembly 40 can both be seen as single virtual images SP, S'P' without or with minimal existence of a corresponding secondary or ghost image S, S'.

In still further embodiments, the vehicle 20 may also include autonomous driving system 400 that allows the vehicle 20 to navigate without human input or otherwise provides input to the driver to assist in navigating the vehicle. The autonomous driving system 400 may provide information to the driver in many forms, including but not limited to information regarding lane departure, distracted driving, adaptive cruise control, sign identification, and the like. In certain embodiments, the autonomous driving system 400 uses the data processed within the processing unit 53 of the computer 51 and sent from the front-facing camera 23 to identify appropriate navigation paths for the vehicle 20 in view of the objects 350 identified. In vehicles 20 including the head up display 25, such objects 350 may also be viewed virtually in a second portion 200 of the window assembly 40 by the driver.

In yet still further embodiments, as shown in FIG. 12, the window assembly 40 may further include transparent layer 124 that is with the first portion 100 of the window assembly. In one embodiment, the transparent layer 124 is disposed between the inner and outer transparent sheets 50, 60. Disposal of the transparent layer 124 between inner and outer transparent sheets 50, 60 protects the transparent layer 124 from direct contact with environmental factors which may damage the transparent layer 124 such as snow, ice, and the like. Alternatively, the transparent layer 124 may be disposed on the second surface 64 of the outer transparent sheet not shown) or the first surface 52 of the inner transparent sheet 50 (not shown).

In certain embodiments, such as in FIG. 12, the transparent layer 124 is sandwiched (i.e., disposed) between the inner transparent sheet 50 and the adjacent interlayer 70. In other embodiments, the transparent layer 124 is sandwiched (i.e., disposed) between outer transparent sheet 60 and the adjacent interlayer 70.

Typically, the transparent layer 124 is substantially transparent to light. Accordingly, a driver or occupant of the vehicle 20 may see through the window assembly 40 having the transparent layer 124. When the transparent layer 124 is included in the window assembly 40, the window assembly 40 exhibits generally greater than seventy percent visible light transmission through the window assembly 40 as required by current U.S. government standards.

In certain embodiments, the transparent layer 124 functions as a water-repellent layer for the window assembly 40 of the vehicle 20. In these instances (not shown), the transparent layer 124 is disposed on the second surface 64 of the outer transparent sheet 60.

In certain embodiments, the transparent layer 124 reflects heat from sunlight penetrating the window assembly 40. In particular, the transparent layer 124 reduces transmission of infrared radiation through the window assembly 40.

The transparent layer 124 may include and/or be formed from one or more coatings and/or films of selected compositions. The coatings and/or films forming the transparent layer 124 may be single or multiple layers. The transparent layer 124 may be disposed in or on the window assembly 40 according to any suitable method, such as chemical vapor deposition, magnetron sputter vapor deposition, spray pyrolysis, and the like.

As shown in FIG. 12, the transparent layer 124 defines an area 126 spanning the window assembly 40 that may include or not include the first portion 100 of the window assembly 40. The area 126 may span a majority of the window assembly 40. Specifically, the majority of the window assembly 40 is defined generally as greater than fifty percent of the window assembly 40. More typically, the majority is greater than seventy-five percent of the window assembly 40. The transparent layer 124 may span the majority of the window assembly 40 for minimizing the transmission of infrared radiation through the window assembly 40. Alternatively, the area 126 of the transparent layer 124 may span a minority of the window assembly 40. For example, the area 126 may span twenty percent of the window assembly 40 along the upper portion of the window assembly 40.

As also shown in FIG. 12, the area 126 of the transparent layer 124 may define any suitable shape. In one embodiment, the area 126 of the transparent layer 124 corresponds to the upper edge 44, the opposing lower edge 42, and a pair of opposing side edges 46, 48 connecting the upper and lower edges 44, 42 as defined above. In one instance, the area 126 defines a shape that is geometrically similar to shape defining the peripheral edge of the window assembly 40. However, the area 126 may have any suitable shape for spanning the window assembly 40.

In certain embodiments, the transparent layer 124 includes a metal compound such that the transparent layer 124 is electrically conductive. As mentioned herein, the term "electrically conductive" refers generally to a material, such as a conductor, exhibiting electrical conductivity for effectively allowing flow of electric current through the material. Conversely, the transparent layer 124 may have any suitable sheet resistance or surface resistance. In one example, the transparent layer 124 has a sheet resistance in a range between 0.5-20 Ω/sq. In another example, the transparent layer 124 has a sheet resistance in a range between 8-12 Ω/sq.

In one embodiment, the metal compound includes a metal oxide. The metal oxide may include a tin oxide, such as indium tin oxide, or the like. The transparent layer 124 may include other metal oxides, including, but not limited to, silver oxide. Alternatively, the metal compound may include a metal nitride, and the like. The metal compound may also be doped with an additive, such as fluorine. Specifically, the additive may be included in the metal compound to optimize the light transmittance and electrical conductivity of the transparent layer 124.

In embodiments herein the transparent layer 124 includes the metal compound and is disposed on the window assembly 40 in areas corresponding to the first portion 100 of the window assembly 40 (and hence the first portion 78 of the interlayer 70), the front-facing camera 23 is limited to a visible light front-facing camera 23, as the metal compound within the transparent layer 124 functions to block light transmissions in the infrared wavelength range.

While the embodiments above describe a head up display 25 for use with second portion 200 of the window assembly 40 to reduce the effects of double imaging in the virtual display from the projector, the second portion 200 of the window assembly 40 is not limited in function for use with a head up display 25. For example, in other embodiments not shown, a second device that receives light transmissions through the second portion 200 of the window assembly 40 may be substituted for the head up display 25. For example, an additional forward facing camera (not shown) the same or different from the front-facing camera 23 may be utilized in conjunction with the second portion 200 of the window assembly 40. Accordingly, the second front-facing camera may receive light transmissions from the same or different objects 350 located in front of the vehicle 20, and the data collected from both front-facing cameras could be used separately or collectively within the vehicle 20. For example, in vehicles having an autonomous driving system 400, information in the form of data processed within the processing unit 53 of the computer 51 and sent from both front-facing cameras to identify appropriate navigation paths for the vehicle 20 in view of the objects 350 identified and without driver input. In vehicles 20 also including the head up display 25, such objects 350 identified from either camera may also be viewed virtually in a second portion 200 of the window assembly 40 by the driver.

While the embodiments above describe the present invention in terms of two separate and distinct portions of the window assembly 100, 200 with corresponding portions 78, 79 of the interlayer 70 having distinct variable profiles, the invention is not limited to window assemblies having only two such portions. For example, in other embodiments, three or more distinct portions of the interlayer 70 may have varying thicknesses defining distinct variable profiles to allow the use of a corresponding number of light receiving devices such as cameras and the like, with each of the distinct portions of the interlayer having a variable portion calibrated to reduce or minimize the effects of double imaging to those respective devices.

In even still further embodiments of the present invention, the second portion of the window assembly may be associated with another device contained within the vehicle (other than a front facing camera 23 or HUD unit 25) or a person positioned within the passenger compartment of the vehicle that receives light transmissions through the second portion of the interlayer of the window assembly.

Thus, for example, in yet still further embodiments of the present invention in which the vehicle 20 includes a front facing camera 23 but does not include a head up display unit 25, the second portion 79 of interlayer 70 may be positioned corresponding to the eye level of the driver 150 of the vehicle 20. Accordingly, the driver 150 of the vehicle 20 may view objects 350 through the second portion 79 of the interlayer 70. In these embodiments, the second portion 79 of the interlayer 70 includes a variable thickness profile (i.e., the second variable thickness profile) that is designed to minimize or reduce double images of the object or objects 350 as viewed by the driver 150 through the second portion 79. Accordingly, in certain embodiments, as opposed to the embodiments including a head up display 25 wherein the second variable thickness profile increases in thickness in a direction away from the bottom edge 76, 76B and towards the middle portion 75, the second variable thickness profile is designed to decrease in thickness in a direction away from the bottom edge 76, 76B and towards the middle portion 75. Alternatively, in another example, both the first portion 78 and the second portion 79 of the interlayer 70, having distinct wedge shaped thickness profiles, may be positioned for use with any device located on or within the vehicle 20 (other than a front facing camera 23 or HUD unit 25) or any person within the passenger compartment 24 of the vehicle that receives light transmissions through the respective first or second portion 78, 79 and typically experiences effects of double images as noted above.

The present invention has been described herein in an illustrative manner. It is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. A system for a vehicle having a vehicle frame, the vehicle frame having a pair of side portions extending between a top portion and a bottom portion that collectively define a front opening there within, said system comprising:
    a window assembly having an upper edge, a lower edge, a first side edge and a second side edge each extending between said upper edge and said lower edge, said first side edge opposite said second side edge, said window assembly adapted to be installed within the front opening of the vehicle frame such that said upper edge is positioned adjacent to the top portion and said lower edge is positioned adjacent to the bottom portion and such that said first and second side edge are positioned adjacent to a respective one of the pair of side portions, said window assembly comprising;
    an inner transparent sheet,
    an outer transparent sheet, and
    an interlayer of polymer disposed between said inner transparent sheet and said outer transparent sheet, wherein a first portion of said interlayer has a first variable thickness profile and wherein a second portion of said interlayer has a second variable thickness profile, said first portion of said interlayer distinct from said second portion of said interlayer; and
    a front-facing camera positioned within the vehicle for receiving light transmissions from an object located outside the vehicle through said first portion, wherein said first variable thickness profile is configured to reduce or minimize light displacement associated with light reflectance of the light transmissions within said window assembly traveling from said object to said front-facing camera through said first portion.

2. The system of claim 1, wherein said first portion is positioned within said interlayer in a location closer to said upper edge than to said lower edge.

3. The system of claim 1, wherein said first portion is positioned within said interlayer in a location closer to said first side edge than said second side edge such that said first portion of said interlayer corresponds to a line of sight of a driver of the vehicle, or
    wherein said first portion is positioned within said interlayer in a location closer to said second side edge than said first side edge such that said first portion of said interlayer corresponds to a line of sight of a passenger of the vehicle, or
    wherein said first portion is positioned within said interlayer in a location equidistant from said first side edge and said second side edge.

4. The system of claim 1, wherein said first variable thickness profile decreases in thickness within said first portion in a direction towards said upper edge.

5. The system of claim 1, wherein said second portion of said interlayer is positioned within said interlayer in a location closer to said bottom edge than said first portion of said interlayer.

6. The system of claim 5, wherein said second variable thickness profile decreases in thickness in a direction towards said bottom edge.

7. The system of claim 5 further comprising a head up display associated with said second portion of said interlayer.

8. The system of claim 1, wherein said front-facing camera is a visible light front-facing camera.

9. The system of claim 1, wherein said window assembly further comprises a transparent coating layer, said transparent coating layer including a metal compound,
    wherein said transparent coating layer is disposed between said inner transparent sheet and said interlayer, or
    wherein said transparent coating layer is disposed between said outer transparent sheet and said interlayer.

10. The system of claim 9, wherein said transparent coating layer is positioned in said window assembly such that light transmissions received from said object by said front-facing camera travels through said transparent coating layer.

11. The system of claim 1, wherein said front-facing camera is coupled to an autonomous driving system.

12. A vehicle comprising the system according to claim 1.

13. A vehicle comprising:
a passenger compartment,
a vehicle frame adjacent to and partially defining said passenger compartment, said vehicle frame having a pair of side portions extending between a top portion and a bottom portion, wherein said pair of side portions and the top and bottom portions define a front opening within the vehicle frame;
a window assembly installed within said front opening of said vehicle frame, said window assembly comprising;
an inner transparent sheet,
an outer transparent sheet, and
an interlayer of polymer disposed between said inner transparent sheet and said outer transparent sheet, wherein a first portion of said interlayer has a first variable thickness profile and wherein a second portion of said interlayer has a second variable thickness profile, said first portion of said interlayer distinct from said second portion of said interlayer; and
a front-facing camera positioned within said passenger compartment for receiving light transmissions through said first portion of said interlayer,
wherein said first portion of said interlayer is positioned for transmitting light from an object located outside the vehicle to said front-facing camera when said window assembly is installed within said front opening of the vehicle.

14. The vehicle of claim 13 further comprising a head up display associated with said second portion of said interlayer.

15. The vehicle of claim 13, wherein said front-facing camera is a visible light front-facing camera.

16. The vehicle of claim 13 further comprising an autonomous driving system, wherein said front-facing camera is coupled to said autonomous driving system.

17. A method for forming a system for a vehicle having a front-facing camera and optionally having a head up display, the vehicle having a vehicle frame adjacent to and partially defining a passenger compartment of the vehicle, the vehicle frame having a pair of side portions extending between a top portion and a bottom portion that collectively define a front opening there within, the method comprising:
forming a window assembly, the assembly comprising:
an inner transparent sheet,
an outer transparent sheet, and
an interlayer of polymer disposed between said inner transparent sheet and said outer transparent sheet, wherein a first portion of said interlayer has a first variable thickness profile and wherein a second portion of said interlayer has a second variable thickness profile, said first portion of said interlayer distinct from said second portion of said interlayer;
installing the window assembly within the front opening of the vehicle; and
mounting the front-facing camera within the passenger compartment such that the light transmissions are received by the front-facing camera from outside the vehicle through the first portion of the interlayer.

18. The method of claim 17, wherein the vehicle has the head up display, and wherein the method further comprises:
mounting the head up display within the passenger compartment such that the light transmissions are received by the head up display from outside the vehicle through the second portion of the interlayer.

* * * * *